US012613752B2

(12) United States Patent
Xiao et al.

(10) Patent No.: US 12,613,752 B2
(45) Date of Patent: Apr. 28, 2026

(54) REDEPLOYING WORKLOAD BASED ON EXPANDED COMPUTING CAPACITY

(71) Applicant: Ainnocence Technologies LLC, Miami, FL (US)

(72) Inventors: Pinyu Xiao, Guangzhou City (CN); Lurong Pan, Vestavia Hill, AL (US)

(73) Assignee: Ainnocence Technologies LLC

( * ) Notice: Subject to any disclaimer, the term of this patent is extended or adjusted under 35 U.S.C. 154(b) by 929 days.

(21) Appl. No.: 17/819,345

(22) Filed: Aug. 12, 2022

(65) Prior Publication Data

US 2023/0393902 A1    Dec. 7, 2023

(51) Int. Cl.
*G06F 9/50*        (2006.01)

(52) U.S. Cl.
CPC .......... *G06F 9/5072* (2013.01); *G06F 9/5083* (2013.01); *G06F 2209/5022* (2013.01)

(58) Field of Classification Search
CPC ................. G06F 9/5072; G06F 9/5083; G06F 2209/5022; G06F 9/5005; G06F 9/45558; G06F 9/546
See application file for complete search history.

(56) References Cited

U.S. PATENT DOCUMENTS

| | | | | |
|---|---|---|---|---|
| 7,080,378 B1 * | 7/2006 | Noland | ................. | G06F 9/5083 |
| | | | | 709/224 |
| 8,806,490 B1 * | 8/2014 | Pulsipher | ............... | G06Q 10/10 |
| | | | | 718/100 |
| 8,826,277 B2 * | 9/2014 | Chang | ................... | G06F 9/5072 |
| | | | | 718/1 |
| 9,971,621 B1 * | 5/2018 | Berg | ...................... | G06F 9/5077 |
| 10,303,663 B1 * | 5/2019 | Kinney, Jr. | ......... | G06F 16/1873 |
| 10,430,225 B1 * | 10/2019 | Harland | .............. | G06F 9/45558 |
| 10,461,943 B1 * | 10/2019 | Norum | ................ | H04L 63/0823 |
| 10,496,432 B1 * | 12/2019 | Zhang | ................. | G06F 9/45558 |
| 10,593,009 B1 * | 3/2020 | Surani | ...................... | G06T 1/20 |
| 10,911,405 B1 * | 2/2021 | Harland | .............. | H04L 63/0236 |
| 10,972,449 B1 * | 4/2021 | Levin | .................... | G06F 21/606 |
| 11,169,720 B1 * | 11/2021 | Al-Harbi | .............. | G06F 16/188 |
| 11,170,137 B1 * | 11/2021 | Richardson | ............ | G06N 10/20 |
| 11,218,419 B1 * | 1/2022 | Sharifi Mehr | .......... | H04L 47/50 |
| 11,270,220 B1 * | 3/2022 | Richardson | ........... | G06F 9/5044 |
| 11,281,498 B1 * | 3/2022 | Kinney, Jr. | .......... | G06F 9/4881 |
| 11,347,550 B1 * | 5/2022 | Harjono | ................ | G06F 9/5077 |

(Continued)

*Primary Examiner* — Benjamin C Wu
(74) *Attorney, Agent, or Firm* — Jason C. Cameron

(57) ABSTRACT

The present application provides a data processing method, system, electronic equipment and storage medium based on a cloud platform, which are applied to the technical field of cloud computing processing, wherein the data processing method comprises the following steps: obtaining task processing requests submitted by several target users through a distributed system, wherein the task processing requests are requests for processing scientific computing tasks; Determining whether the number of the obtained task processing requests reaches a preset capacity expansion threshold, and if so, generating a workload capacity expansion request; Performing capacity expansion processing on the computing node according to the capacity expansion request; The workload is redeployed based on the computing nodes after capacity expansion processing, so as to execute the scientific computing task based on the redeployed workload.

16 Claims, 8 Drawing Sheets

(56)          References Cited

U.S. PATENT DOCUMENTS

| | | | |
|---|---|---|---|
| 11,971,902 B1 * | 4/2024 | Warfield | G06F 16/27 |
| 11,989,586 B1 * | 5/2024 | Srikanta | G06F 9/505 |
| 11,995,466 B1 * | 5/2024 | Srikanta | H04L 67/02 |
| 2004/0083481 A1 * | 4/2004 | Shultz | G06F 9/45533 |
| | | | 719/312 |
| 2005/0268298 A1 * | 12/2005 | Hunt | G06F 9/5077 |
| | | | 718/1 |
| 2008/0240150 A1 * | 10/2008 | Dias | H04L 47/70 |
| | | | 370/252 |
| 2014/0237476 A1 * | 8/2014 | Steffen | G06F 9/505 |
| | | | 718/103 |
| 2015/0339150 A1 * | 11/2015 | Yanagisawa | G06F 9/45558 |
| | | | 718/1 |
| 2017/0019462 A1 * | 1/2017 | Hara | H04L 43/062 |
| 2017/0339196 A1 * | 11/2017 | Lewis | H04L 63/083 |
| 2018/0349202 A1 * | 12/2018 | Sharma | H04L 41/0897 |
| 2019/0222988 A1 * | 7/2019 | Maes | H04L 41/5054 |
| 2019/0243688 A1 * | 8/2019 | Karmarkar | G06F 9/5083 |
| 2020/0067778 A1 * | 2/2020 | Kothari | H04L 41/5025 |
| 2021/0389995 A1 * | 12/2021 | Sato | G06F 9/5083 |
| 2022/0075610 A1 * | 3/2022 | Wang | G06F 8/63 |
| 2022/0374451 A1 * | 11/2022 | Dageville | G06F 16/9538 |
| 2023/0244966 A1 * | 8/2023 | Sharma | G06N 5/043 |
| | | | 706/12 |
| 2023/0259408 A1 * | 8/2023 | Grushka | G06F 9/505 |
| | | | 718/105 |
| 2023/0318988 A1 * | 10/2023 | Wang | H04L 47/781 |
| | | | 709/226 |
| 2023/0393902 A1 * | 12/2023 | Xiao | G06F 9/5072 |
| 2024/0004698 A1 * | 1/2024 | Dolphine | G06F 9/5072 |
| 2024/0037472 A1 * | 2/2024 | Ness | G06Q 10/06316 |
| 2025/0173183 A1 * | 5/2025 | Trikande | G06F 9/5027 |
| 2025/0173597 A1 * | 5/2025 | Olgiati | G06N 20/00 |
| 2025/0175423 A1 * | 5/2025 | Vippagunta | G06F 9/505 |

* cited by examiner

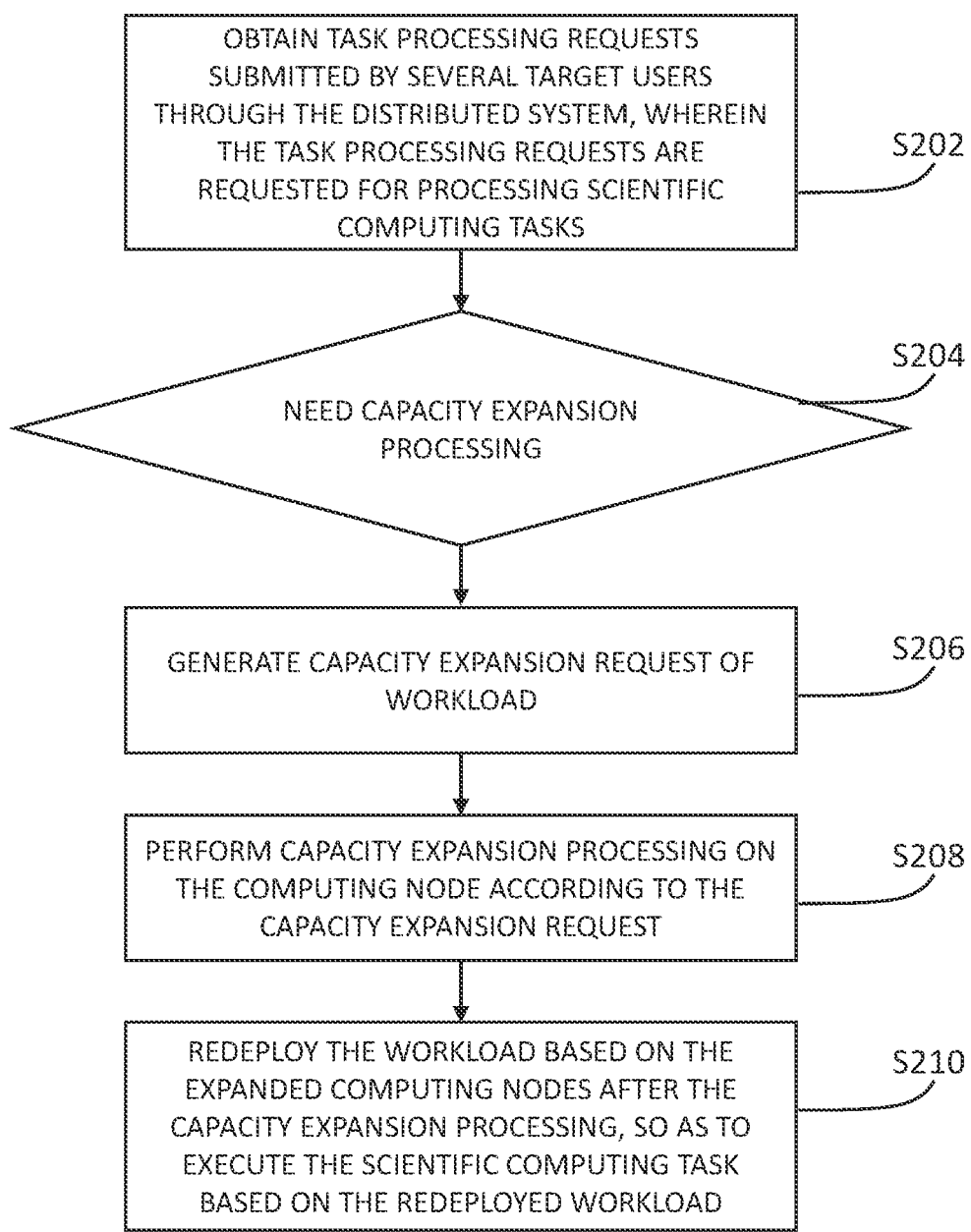

OBTAIN TASK PROCESSING REQUESTS
SUBMITTED BY SEVERAL TARGET USERS
THROUGH THE DISTRIBUTED SYSTEM, WHEREIN
THE TASK PROCESSING REQUESTS ARE
REQUESTED FOR PROCESSING SCIENTIFIC
COMPUTING TASKS
— S202

NEED CAPACITY EXPANSION
PROCESSING
— S204

GENERATE CAPACITY EXPANSION REQUEST OF
WORKLOAD
— S206

PERFORM CAPACITY EXPANSION PROCESSING ON
THE COMPUTING NODE ACCORDING TO THE
CAPACITY EXPANSION REQUEST
— S208

REDEPLOY THE WORKLOAD BASED ON THE
EXPANDED COMPUTING NODES AFTER THE
CAPACITY EXPANSION PROCESSING, SO AS TO
EXECUTE THE SCIENTIFIC COMPUTING TASK
BASED ON THE REDEPLOYED WORKLOAD
— S210

FIG. 2

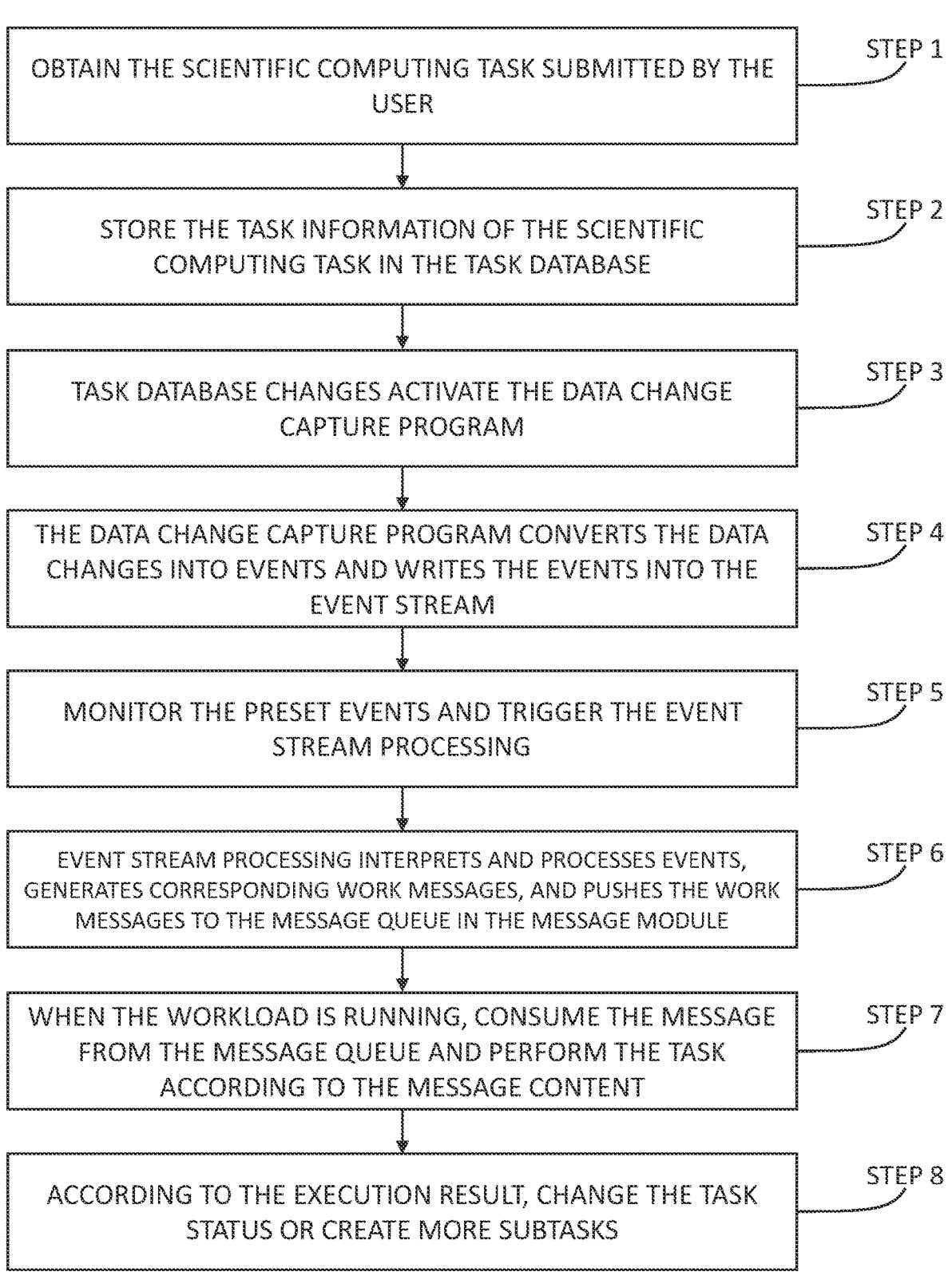

OBTAIN THE SCIENTIFIC COMPUTING TASK SUBMITTED BY THE USER — STEP 1

STORE THE TASK INFORMATION OF THE SCIENTIFIC COMPUTING TASK IN THE TASK DATABASE — STEP 2

TASK DATABASE CHANGES ACTIVATE THE DATA CHANGE CAPTURE PROGRAM — STEP 3

THE DATA CHANGE CAPTURE PROGRAM CONVERTS THE DATA CHANGES INTO EVENTS AND WRITES THE EVENTS INTO THE EVENT STREAM — STEP 4

MONITOR THE PRESET EVENTS AND TRIGGER THE EVENT STREAM PROCESSING — STEP 5

EVENT STREAM PROCESSING INTERPRETS AND PROCESSES EVENTS, GENERATES CORRESPONDING WORK MESSAGES, AND PUSHES THE WORK MESSAGES TO THE MESSAGE QUEUE IN THE MESSAGE MODULE — STEP 6

WHEN THE WORKLOAD IS RUNNING, CONSUME THE MESSAGE FROM THE MESSAGE QUEUE AND PERFORM THE TASK ACCORDING TO THE MESSAGE CONTENT — STEP 7

ACCORDING TO THE EXECUTION RESULT, CHANGE THE TASK STATUS OR CREATE MORE SUBTASKS — STEP 8

FIG. 3

REDEPLOYING WORKLOAD BASED ON EXPANDED COMPUTING CAPACITY

CROSS REFERENCE TO RELATED APPLICATIONS

This application claims priority from a patent application filed in China having patent application No. 2022106236046 filed on Jun. 2, 2022, and titled "A DATA PROCESSING METHOD, SYSTEM, ELECTRONIC EQUIPMENT, AND STORAGE MEDIUM BASED ON CLOUD PLATFORM".

TECHNICAL FIELD OF THE INVENTION

The present application relates to the technical field of cloud computing architecture, and in particular, to a data processing method, system, electronic device, and storage medium based on a cloud platform.

BACKGROUND OF THE INVENTION

The scientific computing involved in drug research and development has the following characteristics: First, it requires great computing power; Second, different computing tasks often require different computing resources, such as CPU (central processing unit), GPU (graphics processing unit), etc. Third, the amount of data involved and generated in the calculation is large; Fourth, the computing requirement is very variable, unlike Internet business computing, which is continuous online real-time computing. The computing requirement in drug research and development often depends on the usage requirement of scientists, such as the non-simultaneous computing requirement of many scientists.

At present, single-machine computing can't meet the requirements of computing power, or even if it satisfied, a computing task may need to run for weeks to months, which seriously affects the work efficiency. In addition, although it is possible to set up a large computer room for scientific computing of drug research and development, the fixed cost is too high, and the computing resources are fixed and the computing requirements are very variable, thus causing great waste when idle.

Therefore, a new data processing scheme is needed for scientific computing of drug research and development.

SUMMARY OF THE INVENTION

In view of this, the embodiment of this specification provides a data processing method, system, electronic equipment and storage medium based on cloud platform, which can meet the high-performance computing requirements of scientific computing in drug research and development, and can greatly reduce the cost of computing resources.

The embodiment of this specification provides the following technical solutions:

An embodiment of this specification provides a data processing method based on a cloud platform, which may include: obtaining task processing requests submitted by several target users through the distributed system, wherein the task processing requests are requests for processing scientific computing tasks; determining whether the number of the obtained task processing requests reaches a preset capacity expansion threshold, and if so, generate capacity expansion request of workload; performing capacity expansion processing on the computing node according to the capacity expansion request; and redeploying the workload based on the expanded computing nodes after the capacity expansion processing, so as to execute the scientific computing task based on the redeployed workload.

The embodiment of this specification also provides a data processing system based on cloud platform, which comprises a distributed task scheduling system, a cloud elastic scaling system and a task execution system, wherein the distributed task scheduling system comprises a task module, the cloud elastic scaling system comprises a workload scaling module and a computing node scaling module, and the task execution system comprises several computing nodes; the task module can be used for a target user to submit a task processing request of a scientific computing task, and determine whether the number of obtained task processing requests reaches a preset capacity expansion threshold, and if so, generate a workload capacity expansion request: the workload scaling module is used to trigger the computing node scaling module to expand the computing node according to the capacity expansion request provided by the task module, the computing node scaling module is used to expand the computing node according to the capacity expansion request; and redeploy the workload based on the expanded computing nodes after the capacity expansion processing, so as to execute the scientific computing task based on the redeployed workload.

The embodiment of the specification also provides the electronic device, including: at least one processor; and a memory connected in communication with the at least one processor; wherein, the memory stores instructions that can be executed by the at least one processor, and the instructions are executed by the at least one processor to enable the at least one processor to execute the data processing method: the data processing method according to any one of the embodiments of this specification.

An embodiment of this specification also provides a computer storage medium, the computer storage medium stores computer executable instructions, and when the computer executable instructions are executed by a processor, execute the data processing method according to any one embodiment of this specification.

Compared with the prior art, the beneficial effects of at least one of the above technical solutions adopted in the embodiments of the specification at least include:

Based on the massive infrastructure that cloud computing can provide, by building and designing a scientific computing platform for drug research and development on the cloud, it is equivalent to having a massive computing infrastructure, so there is no need to set up a computer room or maintain machinery and equipment on its own, and different types and quantities of machine resources and different types and sizes of storage resources can be allocated as needed. And, by supporting large-scale elastic scaling heterogeneous computing nodes in the platform, the computing nodes can be dynamically scaled according to the computing requirement. When there is computing requirement, the most suitable machine type can be selected and the most suitable machine quantity can be expanded. When there is no computing requirement, all the computing nodes of the idle platform can be released, which can not only greatly improve the resource utilization rate, save cost and energy, but also meet the high-performance computing demand of drug research and development, and achieve the purpose of cost reduction and efficiency increase.

BRIEF DESCRIPTION OF DRAWINGS

In order to illustrate the technical scheme of the embodiments of this application more clearly, the following will briefly introduce the drawings needed to use in the embodiments. Obviously, the drawings in the following description are only some of the embodiments of the present application. For persons of ordinary skill in this field, other drawings can be obtained according to these drawings without any creative effort.

FIG. 2 is a flowchart of a data processing method based on cloud platform in the present application;

FIG. 3 is a flowchart of a data processing method based on a cloud platform in the present application;

DETAILED DESCRIPTION

Figure 1:
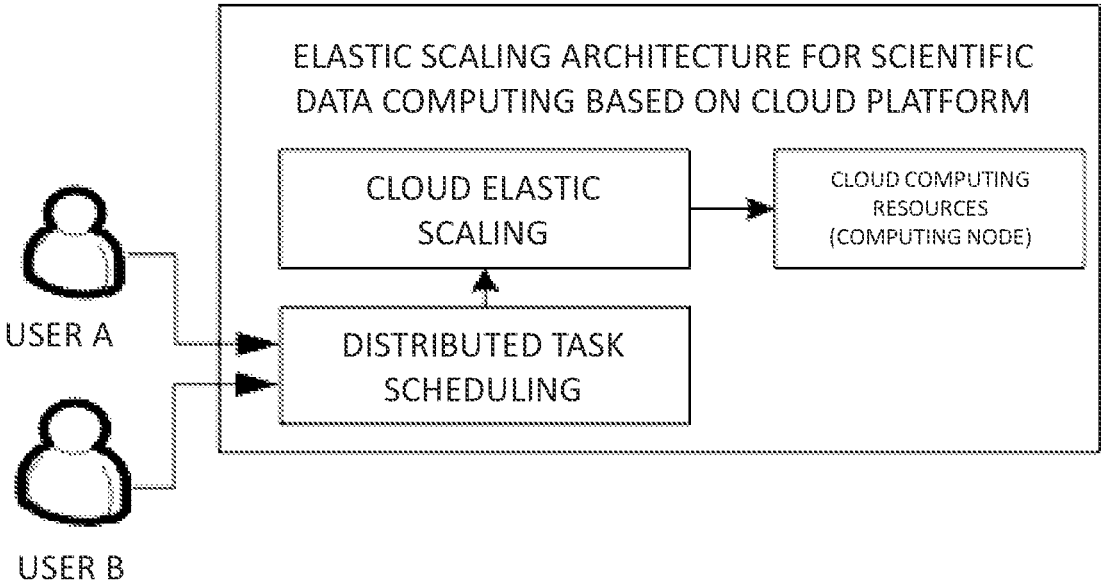
FIG. 1 is a structural schematic diagram of an elastic scaling architecture for scientific data computing based on a cloud platform in the present application.

The embodiments of that present application are described in detail below with reference to the drawings.

The embodiments of the present application are described below by way of specific examples, and those skilled in the art can easily understand other advantages and effects of the present application from the contents disclosed in this specification. Obviously, the described embodiments are only a part of the embodiments of the present application, but not all of the embodiments. The present application may be implemented or applied by different other embodiment, and that details of the present specification may be modified or changed from various aspect and applications without departing from the spirit of the present application. It should be noted that the following embodiments and the features in the embodiments can be combined with each other without conflict. Based on the embodiments in the present application, all other embodiments obtained by persons of ordinary skill in the art without creative work are within the scope of the protection of the present application.

It should be noted that various aspects of embodiments within the scope of the appended claims are described below. It should be apparent that the aspects described herein may be embodied in a wide variety of forms, and that any specific structures and/or functions described herein are merely illustrative. Based on the present application, persons skilled in the art will appreciate that one aspect described herein may be implemented independently of any other aspect and that two or more of these aspects may be combined in various ways. For example, any number and aspects set forth herein may be used to implement an apparatus and/or practice a method. In addition, the apparatus may be implemented and/or the method practiced using other structures and/or functionalities in addition to one or more of the aspects set forth herein.

It should also be noted that the illustrations provided in the following examples illustrate the basic concepts of the present application by way of illustration only. The drawings only show the components related to the present application and are not drawn according to the number, shape and size of the components in the actual implementation. The type, number and proportion of each component in the actual implementation may be changed at will, and the layout type of the components may be more complicated.

In addition, in the following description, specific details are provided to facilitate a thorough understanding of the examples. However, persons skilled in the art will understand that the described aspects may be practiced without these specific details.

At present, a large amount of scientific data computing is needed in drug research and development. If the traditional single-computer computing mode is adopted, the computing power can't basically meet the demand. If a large computer room is invested, not only the fixed cost will be large, but also a large amount of computing resources will be idle because the computing demand is not fixed.

In view of this, through in-depth research and improvement exploration of scientific data computing in drug research and development, and application exploration of existing cloud computing platforms, the embodiment of this specification proposes a new data processing scheme: as shown in FIG. 1, in the elastic scaling processing architecture for scientific data computing based on cloud platform, scientists in drug research and development (such as user A and user B, etc.) can submit scientific computing tasks based on distributed task scheduling, and then determine cloud elastic scaling measures in real time based on these tasks, and finally based on cloud elastic scaling measures, the cloud computing resources (i.e. computing nodes) are scaled and adjusted in real time.

It should be noted that cloud computing resources can be the infrastructure used for massive data computing in the cloud platform, and deployment based on the cloud platform is equivalent to having massive computing infrastructure, which can be provided by cloud service providers after construction, no need for the application party to set up its own computer room, or no need for application party to maintain, and the application party can allocate different types and quantities of machine resources, and different types and sizes of storage resources, and other computing resources as required.

Therefore, based on the massive infrastructure provided by cloud computing, a scientific computing platform for drug research and development which can scale and adjust computing resources (such as heterogeneous computing nodes) is designed and deployed in the cloud platform. It can dynamically scale computing nodes based on computing requirements, that is, when there is computing demand, select the most suitable machine type and expand the most suitable number of machines, and when there is no computing demand, release all idle computing nodes, which can not only meet the high-performance computing requirements of scientific computing tasks in drug research and development, but also no need too much investment cost, and it can greatly improve the resource utilization rate by scaling adjustment, so as to achieve the purpose of cost reduction and efficiency increase.

The technical solutions provided by the embodiments of the present application are described below with reference to the drawings.

As shown in FIG. 2, an embodiment of this specification provides a data processing method based on a cloud platform, which may include:

S202, obtain task processing requests submitted by several target users through the distributed system, wherein the task processing requests are requests for processing scientific computing tasks.

In implementation, the target users can be users who need to perform scientific computing tasks, such as scientists. At this time, the distributed system is used to obtain task processing requests corresponding to the computing requirements submitted by scientists.

S204, determine whether the number of the obtained task processing requests reaches a preset capacity expansion threshold, and if so, execute the step S206.

By counting the number of tasks, we can know whether the current computing resources are suitable or not, and when determined that the resources may not meet the computing requirements, we can allocate more resources in time through capacity expansion, so as to realize the on-demand resources allocation.

It should be noted that the capacity expansion threshold can be preset and adjusted according to the actual needs of deployed applications, and it is not limited here. In addition, when determined that capacity expansion is not needed, it can be processed according to the preset process, such as capacity expansion processing after waiting for a sufficient number, which is not limited here.

S206, generate a capacity expansion request of workload.

It should be noted that workload refers to configurable resources that can run on cloud resources, such as specific applications, services, functions or specific workloads, etc., thus virtual machines, databases, Docker, Hadoop nodes, applications, etc. can be called workloads on the cloud.

By generating a capacity expansion request of workload, and then the computing resources needed for expansion are allocated by the expansion request to meet the computing requirements.

S208, perform capacity expansion processing on the computing node according to the capacity expansion request.

In implementation, the computing node can refer to the virtual host provided by the cloud service provider, thus the computing node can be expanded according to the workload expansion needs.

In some embodiments, based on the workload required by the computing task, the cloud platform can explain and summarize the requirements of the computing nodes, and then call the elastic scaling API interface provided by the cloud service provider to dynamically adjust the resources required for computing such as the type and number of platform machines in real time, so as to realize the capacity expansion processing of the computing nodes by allocating resources.

S210: Redeploy the workload based on the expanded computing nodes after the capacity expansion processing, so as to execute the scientific computing task based on the redeployed workload.

After the capacity expansion processing of the computing nodes is completed, deploy and run the workload of the computing node, and realize the execution and processing of the scientific computing task.

Through the above steps S202 to S210, based on the massive computing resources provided by the cloud platform, these massive computing resources can be allocated according to the computing requirements of users in real time, so as to realize the capacity expansion of computing nodes, and thus the required workload can be redeployed based on the expanded computing nodes, and the workload can perform scientific computing tasks.

In some embodiments, the task processing request can be flow processed in the cloud platform based on the event streams.

Specifically, when obtain task processing requests submitted by several target users, the data processing method may further include: generating task events corresponding to the task processing requests.

After the event stream is adopted, the judgment of capacity expansion can be realized through event stream processing. Specifically, when determine whether the number of obtained task processing requests reaches the preset capacity expansion threshold, determine whether the number of generated task events reaches the preset capacity expansion threshold, so as to realize rapid event stream processing based on the event triggering of task events.

In some embodiments, the event stream can be triggered by monitoring the task events, that is, whether the number of generated task events reaches the preset capacity expansion threshold. Whether the number of generated task events reaches the preset capacity expansion threshold can be determined by monitoring the generated task events.

In some embodiments, the corresponding work messages can be formed based on the event stream, and then the scaling processing of workload can be realized based on the push of the work messages.

Specifically, after the task event is generated, a first working message corresponding to the task event can be generated based on the task event; Then, when determine whether the number of generated task events reaches the preset capacity expansion threshold, the following judgment can be made based on the pushed work messages: determine whether the number of generated first work messages reaches the preset capacity expansion threshold.

In some embodiments, after the task processing request is obtained, the task processing request is circulated and processed in the cloud platform based on the work message.

Specifically, when the task processing request is obtained, the data processing method may further include: generating a second working message corresponding to the task processing request; Then, after determining whether the number of obtained task processing requests reaches the preset capacity expansion threshold, the following judgment processing can be performed based on the work messages: determining whether the number of generated second work messages reaches the preset capacity expansion In some embodiments, when a workload executes a scientific computing task, the task state can be dynamically adjusted according to the actual execution result, or the task can be split into multiple subtasks.

During implementation, according to the execution result of the scientific computing task executed by the workload in operation, the task state of the scientific computing task is changed in real time, or the scientific computing task is created as multiple subtasks, and then the task corresponding to the changed task state or subtasks is computed based on the computing nodes, which can not only make full use of the computing power of the computing nodes, but also improve the computing performance of the scientific computing task.

In some embodiments, the change of task status and creation of subtasks can generate more events, and the cycle is repeated until no new subtasks are created and the task status does not change, such as the task has been completed or failed, which can improve the processing efficiency of the task.

By splitting a computing task and scheduling it to a large number of machines for processing, computing power is exchanged for time, which greatly reduces the users' waiting time of scientific computing tasks, and can get results faster, which improving work efficiency and R&D iteration speed.

In some embodiments, the workload can be realized as a set of meta-definition information, the required workload can be quickly deployed and implemented through definition information.

Specifically, the workload is set as a set of metadata, wherein the metadata can include the image address of Docker container to be run and the computing resource requirements required to run the workload.

During implementation, metadata can include but not be limited to the following fields: image URL (container mirror address), node type (machine type used to run this container), cpu_requirement (CPU requirement), gpu_requirement (GPU requirement), memory_requirement (memory requirement), storage_requirement (storage requirement), etc. It should be noted that the fields in metadata can be set according to the actual situation of deployment and application, and there is no restriction here.

In some embodiments, the computing nodes can be elastic scaling according to the workload running conditions.

Specifically, determine whether the target workload is running completely, and when determine that the workload is running completely, the computing node that deploys the target workload will enter an idle state.

In some embodiments, determine that the computing node enters the idle state, the idle computing resources can be recycled. Specifically, after determining that the computing node that deploys the target workload enters an idle state, the computing node that deploy the target workload is shut down and recycled.

By allocating computing nodes in real time, when there is computing demand, the most suitable machine type is selected according to the computing demand, and the most suitable machine number is expanded; When there is no computing demand, releasing all the idle platform computing nodes can greatly improve the resource utilization rate and save the cost.

In some embodiments, a user's task request can be obtained based on a database. In the implementation, when obtaining the task processing requests submitted by several target users through the distributed system, it can be realized by the following operations: when several target users submit the task processing requests to the distributed database, obtain the task processing requests based on the data changes of the distributed database.

During implementation, users can store the task information in the distributed task database, and then activate the data change capture program (Change Data Capture, CDC) based on the data changes of the task database (such as data addition, state change, etc.), and the data change capture program will convert the data changes into corresponding processing procedures.

It should be noted that the data change capture methods can be set and adjusted according to the deployment application needs, such as CDC based on timestamp, CDC based on trigger, CDC based on snapshot and CDC based on log, etc., which are not limited here.

In some embodiments, scientific computing tasks submitted by users can be processed jointly based on database, event stream and message stream.

During implementation, the asynchronous event-driven mode can be used for linkage work, as shown in FIG. 3. An example of a procedure is as follows:

Step 1. Obtain the scientific computing task (or task processing request) submitted by the user;

Step 2. Store the task information of the scientific computing task in the task database;

Step 3. Task database changes (data addition or status change) activate the data change capture program (Change Data Capture, CDC);

Step 4. The data change capture program converts the data changes into events, and writes the events into the event stream;

Step 5. Monitor the preset events and trigger the event stream processing;

Step 6. Event stream processing interprets and processes events, generates corresponding work messages, and pushes the work messages to the message queue in the message module;

Step 7. When the workload is running, consume the message from the message queue, and perform the task work according to the message content;

Step 8. According to the execution result, change the task status or create more subtasks, and then the change of task status or the creation of subtasks (entering Step1) will lead to generate more events, and the cycle is repeated until no new subtasks are created and the task status is no longer changed (for example, the task has been completed or failed).

Efficient flow processing based on database, event stream, message stream, etc. can meet the computing performance of tasks and improve the task processing efficiency.

Based on the same inventive concept, the embodiment of this specification provides a data processing system corresponding to the data processing method described in any of the previous embodiments, wherein the data processing system is a data processing system deployed and built based on massive computing resources provided by a cloud platform.

Figure 4:
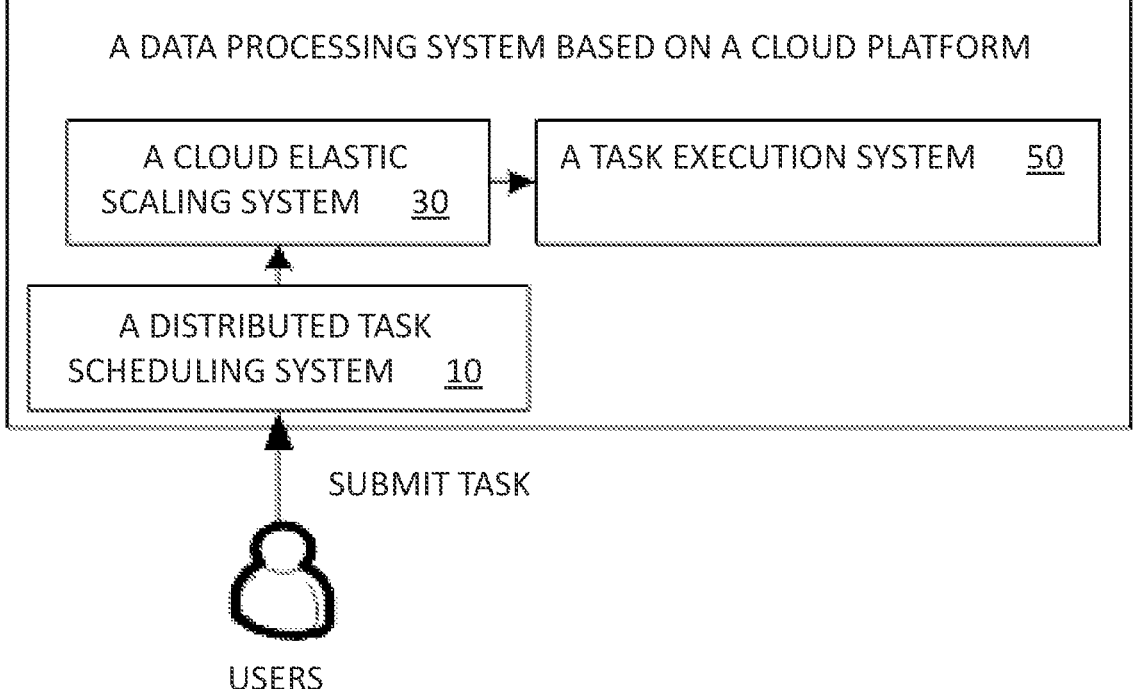
FIG. 4 is a structural schematic diagram of a data processing system based on cloud platform in the present application.

As shown in FIG. 4, a data processing system based on cloud platform provided by the embodiment of this specification may include a distributed task scheduling system 10, a cloud elastic scaling system 30 and a task execution system 50. Wherein the distributed task scheduling system 10 obtains a task processing request submitted by a user, During implementation, the task execution system 50 can be a massive infrastructure (such as configurable computing nodes) provided by the cloud platform, which is not limited here.

Figure 5:
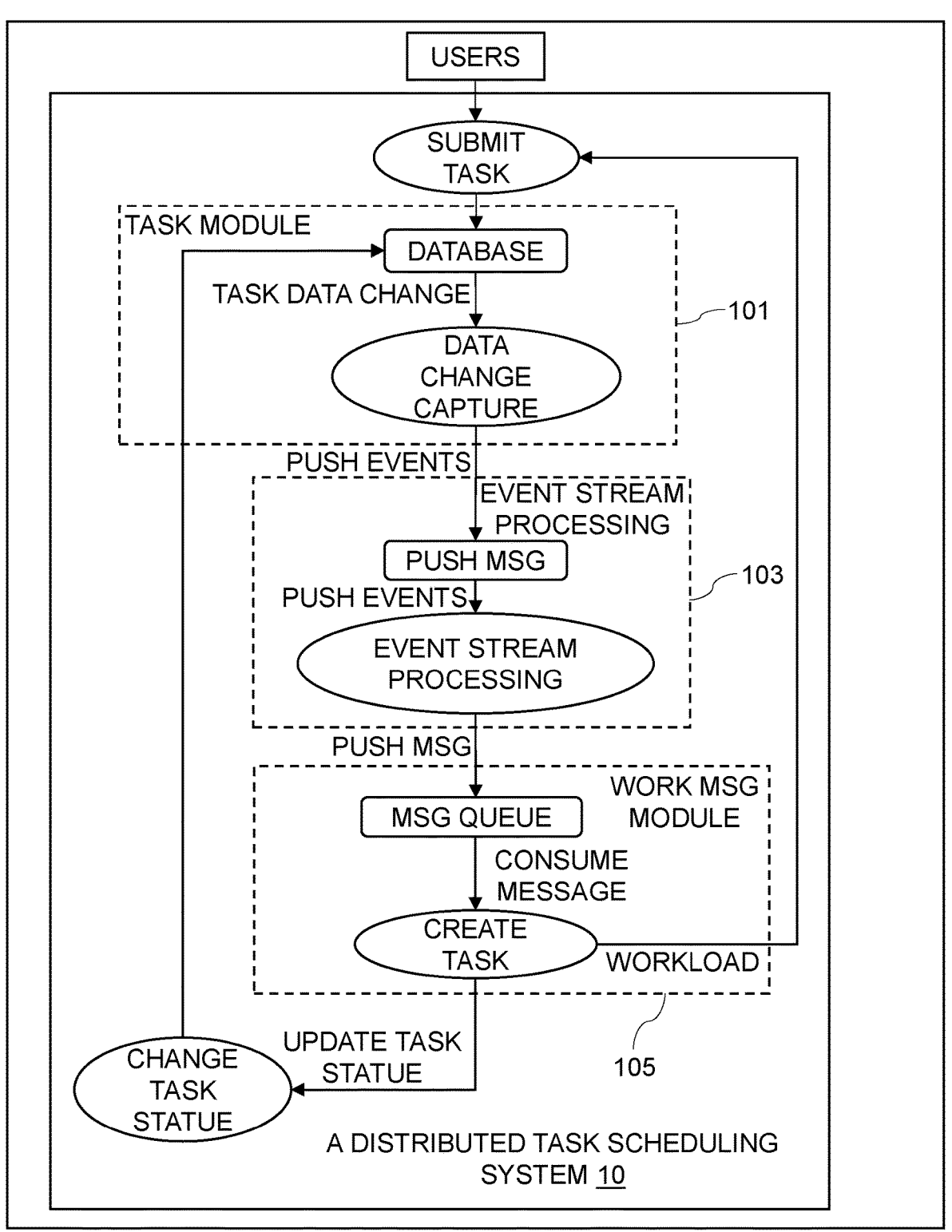
FIG. 5 is a structural diagram of a distributed task scheduling system in a data processing system based on cloud platform in the present application.

During implementation, the distributed task scheduling system 10 can be used as the application layer of the cloud platform. As shown in FIG. 5, the distributed task scheduling system 10 is configured with a task module 101, which is used to interact with users, so that users can submit scientific computing tasks (or put forward to task processing requests) through the task module 101. Specifically, the task module 101 can be used for a target user to submit a task processing request of a scientific computing task, and determine whether the number of obtained task processing requests reaches a preset capacity expansion threshold, and if so, generate a workload capacity expansion request.

Figure 6:
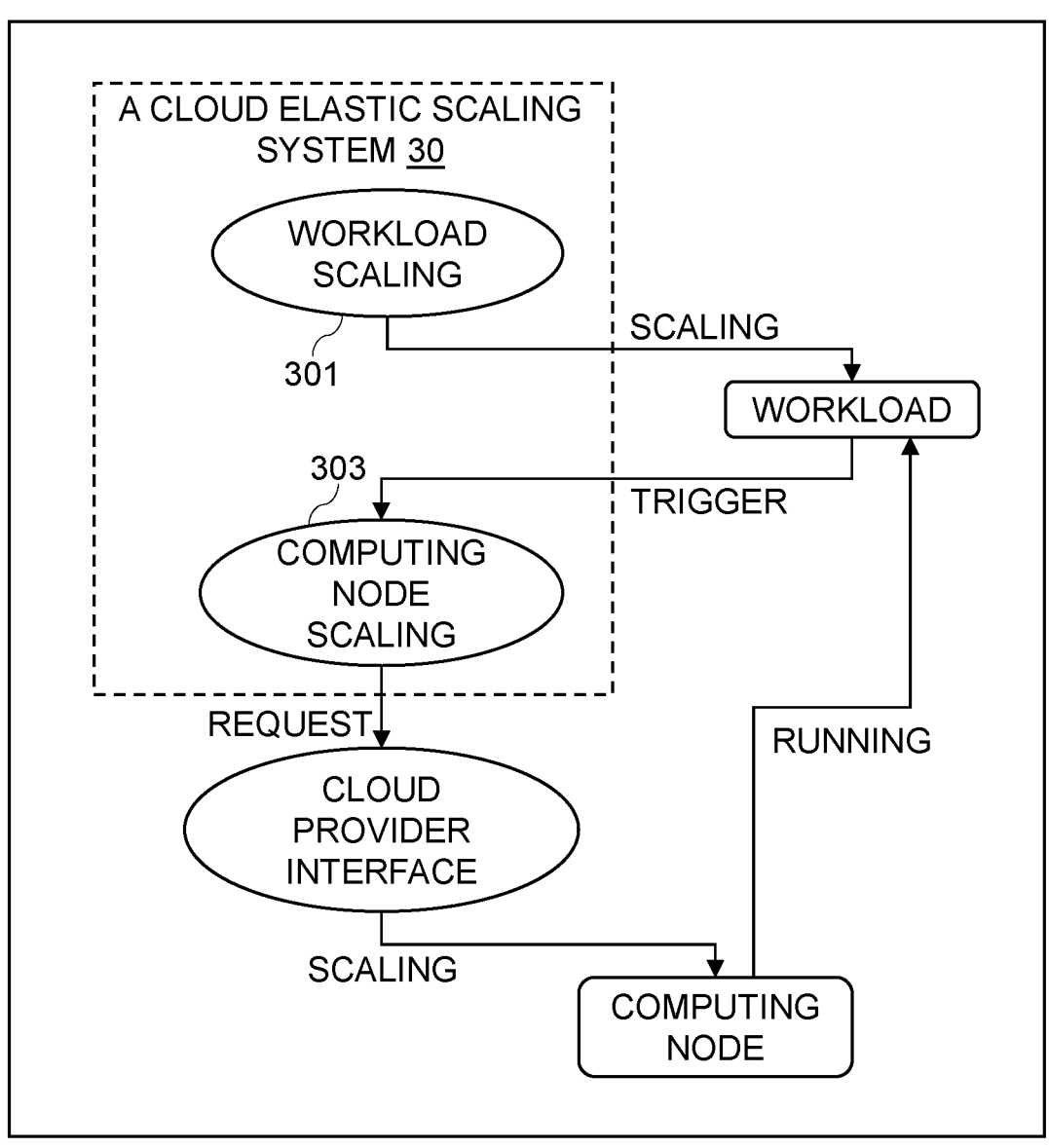
FIG. 6 is a structural schematic diagram of an elastic scaling system in a data processing system based on a cloud platform in the present application.

During implementation, the elastic scaling system 30 acts on the infrastructure layer of the cloud platform. As shown in FIG. 6, it can include two sub-modules, namely, a workload scaling module 301 (workload autoscaler) and a computing node scaling module 303 (node autoscaler). Wherein the workload scaling module 301 is used to trigger the computing node scaling module 303 to expand the computing node according to the capacity expansion request provided by the task module 101, and the computing node scaling module 303 is used to expand the computing node according to the capacity expansion request. Therefore, the implementation of the elastic scaling system 30 is as follows: First, the workload scaling module scales the workload; Then, workload scaling triggers the activity of the capacity expansion module of the computing node; Then, the computing node scaling module invokes the API interface provided by the cloud service provider to perform the machine scale, and the cloud service provider scales the computing node. After the scaled computing node is started, the workload is deployed and run to complete the corresponding computing task.

It should be noted that workload scaling can refer to expanding or shrinking workload, such as expanding a workload from 10 to 100, that is, shorten processing time by increasing computing resources; Computing nodes can refer to a virtual host provided by a cloud service provider; Computing node scaling refers to starting or shutting down the corresponding type of virtual host through the API interface provided by the cloud service provider according to the machine requirements of the workload.

Based on the above example, the workflow of the data processing system is illustrated as follows: the task module 101 obtains the task processing request submitted by the user, and when it is determined that capacity expansion processing is required, it puts forward a capacity expansion processing request to the workload scaling module 301, the workload scaling module determines the corresponding scaling requirement of the workload according to the capacity expansion request, and then triggers the computing node scaling module 303 through the scaling requirement of the workload. The computing node scaling module 303 requests the cloud service provider interface (such as API interface) for the computing node scaling, and then after the computing node completes scaling, the expanded computing node redeploys the workload and runs the workload, so as to perform scientific computing tasks based on the workload redeployed from the expanded computing node, that is, complete computing tasks corresponding to the task processing request.

In some embodiments, the cloud elastic scaling system is a system deployed in the infrastructure layer. In order to develop and deploy computing task processing programs more quickly, a distributed task scheduling system (such as the aforementioned task module 101) can be packaged based on the cloud elastic scaling system, that is, the task scheduling system is packaged in the cloud elastic scaling system.

In some embodiments, as shown in FIG. 5, the task module 101 further includes a distributed database and a data change capture unit, wherein the data change capture unit can be a functional unit packaged with a data change capture program (Change Data Capture, CDC); The distributed database is used for several target users to submit task processing requests for scientific computing tasks; The data change capture unit obtains the task processing request based on the data change of the distributed database.

Specifically, the core components of the task module 101 may include a database and a database data change capture program.

After the task is submitted, it is stored in the database, and its schema definition includes but is not limited to the following core fields: job_id (unique identification of the task), job_type (task type), job_status (task status), job_data (task user-defined information, such as input and output path), etc. The database change capture program can be realized by monitoring and interpreting database change events, such as Binlog log provided by MySQL, which can capture database changes in real time.

In some embodiments, as shown in FIG. 5, the distributed task scheduling system 10 may further include an event module 103, wherein the event module 103 is used to monitor push events (i.e., task events) generated by the task module 101, and determine whether the number of task events reaches a preset capacity expansion threshold, and if so, trigger the workload scaling module to expand the computing node, wherein the task events are events corresponding to task processing requests and can be generated by the task module 101.

As shown in FIG. 5, the core components of the event module can include event stream and event stream processing. It should be noted that well-known stream processing middleware such as Kafka can be used for event stream and event stream processing implementation, and which is not limited here.

In one example, the data change capture unit may be used to push events to the event module 103.

In some embodiments, as shown in FIG. 5, the distributed task scheduling system 10 further includes a work message module 105, which is used to monitor the length change of the message queue to determine whether to trigger the workload scaling module to expand the capacity of the computing node, and the message queue is used to store the work information corresponding to the task processing request.

As shown in FIG. 5, the core components of the work message module can include message queues and workloads. It should be noted that the message queue can be implemented by Amazon Simple Queue Service, and the workload can be implemented based on the Pod of Kubernetes, which is not limited here.

In some embodiments, the distributed task scheduling system is further used to change the task state corresponding to the scientific computing task or create the scientific computing task into multiple subtasks according to the execution result of the scientific computing task executed by the workload.

As shown in FIG. 5, the workload component in the work message module 105 can be used to change the task state or create subtasks to further perform scaling and adjustment processing on the workload, wherein the change of task state and the creation of subtasks lead to the generation of more data streams (such as events), and further processing of data streams will not be explained further.

In some embodiments, the computing node scaling module 303 is further used to detect whether the target computing node enters an idle state, and/or shut down and recycle the target computing node in an idle state.

In some embodiments, as shown in FIG. 5, the distributed task scheduling system 10 may include three sub-modules, namely, a task module 101, an event module 103 and a work message module 105.

During implementation, the three sub-modules can work linkage in asynchronous event-driven mode, and the workflow is as follows:

1. Users submit tasks through the task module;
2. The task module stores the task information into the task database;
3. The change of task database activates the data change capture program (Change Data Capture);
4. The data change capture program converts data changes into events, and writes the events into the event stream in the event module;
5. Event stream preset event processor monitors preset specific events and is triggered, that is, event stream processing;

6. Event stream processing interprets and processes events, generates specific work messages, and pushes the work messages to the message queue in the message module;

7. When the workload is running, consume messages from the message queue, perform task work according to the message content, and change the task state through the task module according to the execution result, or create more subtasks;

8. The change of task status or the creation of subtasks (returning to the above step 1) will lead to more events, and this cycle will continue until no new subtasks are created and the task status is no longer changed (such as the task has been completed or failed).

Figure 7:
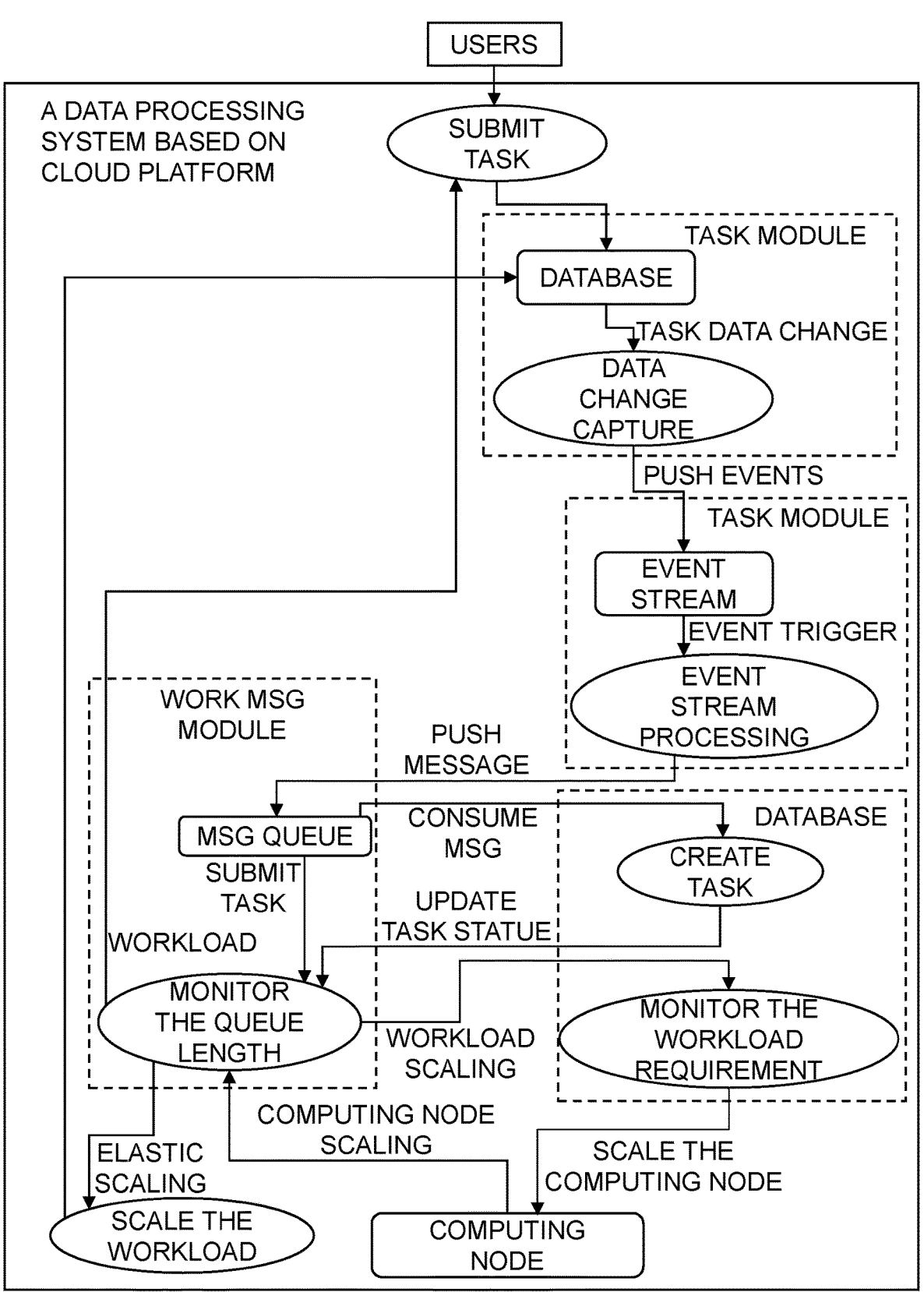
FIG. 7 is a structural schematic diagram of a data processing system based on cloud platform in the present application.

In some embodiments, as shown in FIG. 7, in the overall architecture diagram of the data processing system deployed on the cloud platform, the cloud elastic scaling system and the distributed task scheduling system interact through the working message module, and the working process is as follows:

1. workload scaling module monitors the change of message queue length;

2. The workload scaling module dynamically scales and adjusts the number of the workload according to the change of message queue length;

3. Computing node expansion module monitor the number of workload;

4. The computing node scaling module dynamically scales and adjusts the computing nodes according to the number of the workload;

5. Compute nodes deploy and run workload.

Based on the same inventive concept, the embodiment of this specification provides an electronic device corresponding to the data processing method described in any one of the previous embodiments.

Figure 8:
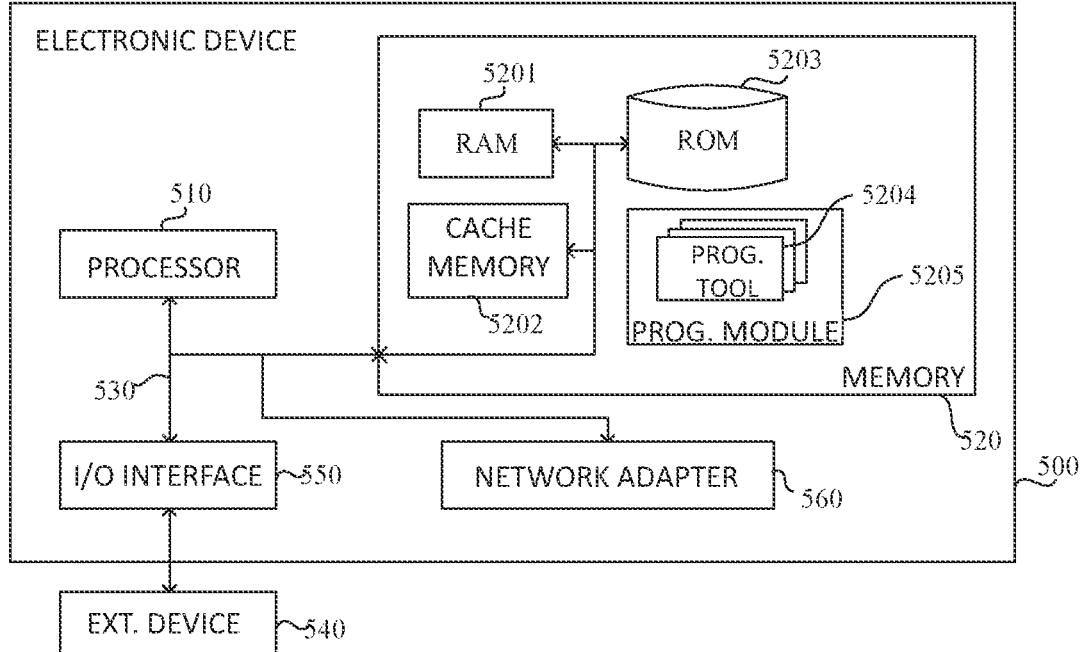
FIG. 8 is a structural schematic diagram of an electronic device for data processing based on a cloud platform in the present application.

FIG. 8 is a schematic structural diagram of an electronic device for data processing provided by the present invention. The figure shows the structure of an electronic device 500 for implementing the data processing solution provided by the present invention. Here, the electronic device 500 is only one example, and should not limit the functions and scope of use of the embodiments of the present invention.

As shown in FIG. 8, the electronic device 500 may include: at least one processor 510; and a memory 520 connected in communication with the at least one processor; wherein, the memory 520 stores instructions that can be executed by the at least one processor 510, and the instructions are executed by the at least one processor 510 to enable the at least one processor 510 to execute the data processing method: the data processing method provided by any one of the embodiments of this specification.

It should be noted that the electronic device 500 may be represented in the form of a general computing device, for example, it may be a server device.

During implementation, the components of the electronic device 500 may include, but are not limited to, the above-mentioned at least one processor 510, the above-mentioned at least one memory 520, and a bus 530 connecting different system components (including the memory 520 and the processor 510), wherein the bus 530 may include data bus, address bus, and control bus.

During implementation, memory 520 may include volatile memory, such as random access memory (RAM) 5201 and/or cache memory 5202, and may further include read only memory (ROM) 5203.

Memory 520 may also include program tools 5205 having a set (at least one) of program modules 5204 including, but not limited to, an operating system, one or more application programs, other program modules, and program data, in these examples Each or some combination of may include an implementation of a network environment.

The processor 510 executes various functional applications and data processing by executing computer programs stored in the memory 520.

The electronic device 500 may also communicate with one or more external devices 540 (e.g., keyboards, pointing devices, etc.). Such communication may occur through input/output (I/O) interface 550. Also, the electronic device 500 may communicate with one or more networks (e.g., a local area network (LAN), a wide area network (WAN), and/or a public network such as the Internet) through a network adapter 560, which communicates with the electronic device 500 through a bus 530. communication with other modules. It should be understood that, although not shown, other hardware and/or software modules may be used in conjunction with electronic device 500, including but not limited to: microcode, device drivers, redundant processors, external disk drive arrays, RAID (disk array) systems, tape drives, and data backup storage systems.

It should be noted that although several units/modules or sub-units/modules of the electronic device are mentioned in the above detailed description, this division is merely exemplary and not mandatory. Indeed, features and functionalities of two or more units/modules described above may be embodied in one unit/module according to the implementations of the present application. Conversely, a feature and functionality of one unit/module described above may be further divided into being embodied by multiple units/modules.

Based on the same inventive concept, an embodiment of this specification provides a computer storage medium, the computer storage medium stores computer executable instructions, and when the computer executable instructions are executed by a processor, execute the data processing method provided by any embodiment of this specification.

It should be noted that the computer storage medium may include, but is not limited to, portable disk, hard disk, random access memory, read-only memory, erasable programmable read-only memory, optical storage device, magnetic storage device or any suitable combination of the above.

In a possible embodiment, the present application can also provide the form of realizing data processing as a program product, which includes program code, and when the program product runs on a terminal device, the program code is used to make the terminal device perform several steps in the method described in any one of the foregoing embodiments.

Wherein, any combination of one or more programming languages can be used to write the program code for executing in the application, and the program code can be completely executed on the user equipment, partially executed on the user equipment, executed as an independent software package, partially executed on the user equipment, partially executed on the remote equipment or completely executed on the remote equipment.

Each embodiment in this specification is described in a progressive way, and the same and similar parts between the various embodiments may be referred to each other, and each embodiment emphasizes to describe the differences from other embodiments. In particular, for the method embodiments described later, since they correspond to the system, the description is relatively simple, and related parts refer to the partial descriptions of the system embodiments.

The embodiments described herein are only specific embodiments of the present application, and are not intended to limit the protection scope of the present application. Any modification or equivalent that can be easily conceived by persons skilled in the art should all fall within the protection scope of the present application. Therefore, the protection scope of the present disclosure is subject to the protection scope of the claims.

We claim:

1. A data processing method based on a cloud platform comprising:

obtaining task processing requests submitted by several target users through a distributed system, wherein the task processing requests are requests for processing scientific computing tasks;

determining whether a number of the obtained task processing requests reaches a preset capacity expansion threshold, and if so, generate a capacity expansion request of workload;

performing capacity expansion processing on a computing node according to the capacity expansion request;

redeploying the workload based on the expanded computing node after the capacity expansion processing, so as to execute the scientific computing task based on the redeployed workload; and setting the workload as a set of metadata, wherein the metadata includes the image address of a docker container to be run and the computing resource requirements required to run the workload.

2. The data processing method based on a cloud platform according to claim 1, wherein when obtaining task processing requests submitted by several target users, the data processing method further includes:

generating task events corresponding to the task processing requests; and determining whether the number of obtained task processing requests reaches the preset capacity expansion threshold, including determining whether the number of generated task events reaches the preset capacity expansion threshold.

3. The data processing method based on a cloud platform according to claim 2, wherein determining whether the number of generated task events reaches the preset capacity expansion threshold is determined by monitoring the generated task events.

4. The data processing method based on a cloud platform according to claim 2, further comprises:

generating a first working message corresponding to the task event is generated based on the task event; and determining whether the number of generated task events reaches the preset capacity expansion threshold includes determining whether the number of generated first work messages reaches the preset capacity expansion threshold.

5. The data processing method based on a cloud platform according to claim 1, wherein when the task processing request is obtained, the data processing method further comprises:

generating a second working message corresponding to the task processing request; and determining whether the number of acquired task processing requests reaches the preset capacity expansion threshold includes determining whether the number of generated second working messages reaches the preset capacity expansion threshold.

6. The data processing method based on a cloud platform according to claim 1, further comprises:

according to an execution result of the scientific computing task executed by the workload in operation, the task state of the scientific computing task is changed in real time, or the scientific computing task is created as multiple subtasks.

7. The data processing method based on a cloud platform according to claim 1, further comprises:

determining whether the workload is running completely, and if so, the computing node that deploys the workload will enter an idle state.

8. The data processing method based on a cloud platform according to claim 7, wherein after determining that the computing node that deploys the workload enters an idle state, the computing node that deploy the workload is shut down and recycled after it is determined that the computing node deploying the workload is in an idle state, the data processing method further comprises:

shutting down and recycling the computing node deploying the workload.

9. The data processing method based on a cloud platform according to claim 1, wherein obtaining task processing requests submitted by several target users through the distributed system comprises:

when several target users submit task processing requests to a distributed database, obtaining the task processing requests based on data changes of the distributed database.

10. A data processing system based on a cloud platform comprising:

at least one processor implementing:

a distributed task scheduling system;

a cloud elastic scaling system; and a task execution system, wherein the distributed task scheduling system comprises a task module, wherein the cloud elastic scaling system comprises a workload scaling module and a computing node scaling module, and wherein the task execution system comprises several computing nodes; and wherein the task module is used for a target user to submit a task processing request of a scientific computing task, and determine whether the number of obtained task processing requests reaches a preset capacity expansion threshold, and if so, generate a workload capacity expansion request;

wherein the workload scaling module is used to trigger the computing node scaling module to expand the computing node according to the capacity expansion request; and wherein the computing node scaling module is used to expand the computing node according to the capacity expansion request;

redeploy the workload based on the expanded computing nodes after the capacity expansion processing, so as to execute the scientific computing task based on the redeployed workload and set the workload as a set of metadata, wherein the metadata includes the image address of a docker container to be run and the computing resource requirements required to run the workload.

11. The data processing system based on a cloud platform according to claim 10, wherein the distributed task scheduling system further comprises:

an event module, wherein the event module is used for monitoring task events and determining whether the number of task events reaches a preset capacity expansion threshold, and if so, triggering the workload scaling module to expand the computing nodes, and wherein the task events are events corresponding to task processing requests.

12. The data processing system based on a cloud platform according to claim 10, wherein the distributed task scheduling system further comprises:

a work message module, wherein the work message module is used for monitoring the length change of a message queue to determine whether to trigger the workload scaling module to expand the computing node, and wherein the message queue is used for storing work information corresponding to the task processing request.

13. The data processing system based on a cloud platform according to claim 10, wherein the computing node scaling module is further used for detecting whether a target computing node enters an idle state, and/or shutting down and recycling the idle target computing node.

14. The data processing system based on a cloud platform according to claim 10, wherein the distributed task scheduling system is further used for changing a task state corresponding to the scientific computing task or creating the scientific computing task into multiple subtasks according to an execution result of the scientific computing task executed by the workload.

15. The data processing system based on a cloud platform according to claim 10, wherein the task module further comprises:

a distributed database; and a data change capture unit, wherein the distributed database is used for several target users to submit task processing requests for scientific computing tasks, and wherein the data change capture unit acquires the task processing request based on the data change of the distributed database.

16. An electronic device, comprising:

at least one processor; and a memory communicatively connected with the at least one processor, wherein the memory stores instructions executable by the at least one processor, and wherein the instructions are executed by the at least one processor to enable the at least one processor to execute the data processing method according to any one of claims 1-6, or 7-9.

\*  \*  \*  \*  \*